United States Patent
Aneziris et al.

(10) Patent No.: US 7,772,145 B2
(45) Date of Patent: Aug. 10, 2010

(54) MANUFACTURE OF ENVIRONMENTALLY FRIENDLY CARBON-BONDED REFRACTORY PRODUCT IN THE COLD MIXING PROCESS

(75) Inventors: Christos Aneziris, Freiberg (DE); Winfried Lothar Boenigk, Lüdinghausen (DE); Dmitry Borzov, Freiberg (DE); Christoph Jacob, Essen (DE); Jens Stiegert, Dortmund (DE); Dirk Schnitzler, Herne (DE); Joachim Ulbricht, Freiberg (DE)

(73) Assignee: Rütgers Chemicals AG, Castrop-Rauxel (DE)

( * ) Notice: Subject to any disclaimer, the term of this patent is extended or adjusted under 35 U.S.C. 154(b) by 0 days.

(21) Appl. No.: 10/586,221

(22) PCT Filed: Jan. 11, 2005

(86) PCT No.: PCT/EP2005/000147

§ 371 (c)(1),
(2), (4) Date: Jul. 14, 2006

(87) PCT Pub. No.: WO2005/068391

PCT Pub. Date: Jul. 28, 2005

(65) Prior Publication Data

US 2007/0161496 A1    Jul. 12, 2007

(30) Foreign Application Priority Data

Jan. 17, 2004  (DE) ........................ 10 2004 002 561

(51) Int. Cl.
| | |
|---|---|
| C04B 35/48 | (2006.01) |
| C10C 1/04 | (2006.01) |
| C10C 3/06 | (2006.01) |
| C10C 1/20 | (2006.01) |
| C10C 3/02 | (2006.01) |
| C08L 95/00 | (2006.01) |
| C09D 4/00 | (2006.01) |
| C09D 101/00 | (2006.01) |
| C09D 201/00 | (2006.01) |

(52) U.S. Cl. .............................. 501/99; 208/41; 208/44; 106/273.1

(58) Field of Classification Search ................... 501/99; 208/41, 44; 106/273.1
See application file for complete search history.

(56) References Cited

U.S. PATENT DOCUMENTS

| | | | | |
|---|---|---|---|---|
| 3,285,760 | A | | 11/1966 | Hildinger et al. ............... 501/90 |
| 3,415,667 | A | | 12/1968 | Cummings, Sr. ............. 501/109 |
| 3,903,025 | A | * | 9/1975 | Farrington et al. ........... 523/141 |
| 4,071,593 | A | | 1/1978 | Farrington et al. ........... 264/330 |
| 4,115,133 | A | * | 9/1978 | Kunkele et al. ............... 501/101 |
| 5,262,043 | A | | 11/1993 | Boenigk et al. ................ 208/41 |
| 5,403,526 | A | | 4/1995 | Kloss et al. ................. 264/29.1 |
| 6,010,617 | A | * | 1/2000 | Mackerer et al. .............. 208/44 |

FOREIGN PATENT DOCUMENTS

| | | |
|---|---|---|
| DE | 31 49 485 A1 | 6/1983 |
| DE | 41 12 955 A1 | 10/1992 |
| EP | 0 708 064 A | 4/1996 |
| EP | 0 957 150 A | 11/1999 |
| GB | 690859 | 4/1953 |

* cited by examiner

*Primary Examiner*—C. Melissa Koslow
*Assistant Examiner*—Matthew E Hoban
(74) *Attorney, Agent, or Firm*—Ohlandt, Greeley, Ruggiero & Perle, L.L.P.

(57) ABSTRACT

The invention relates to a method for manufacturing carbon-bonded refractory products from refractory granulations and organic binder agents, wherein a powdery, graphitable coal-tar pitch with a benzo[a]pyrene content less than 500 mg/kg and a coking value of at least about 80% by weight according to DIN 51905 and a graphitable binder agent liquid at room temperature, with a coking value of at least about 15% by weight and a benzo[a]pyrene content less than 500 ppm according to DIN 51905, are used as organic binder agent, mixed with the remaining constituents, transferred to a mould body, then heat treated at a temperature of 150 to about 400° C.

10 Claims, No Drawings

MANUFACTURE OF ENVIRONMENTALLY FRIENDLY CARBON-BONDED REFRACTORY PRODUCT IN THE COLD MIXING PROCESS

The invention relates to a method for manufacturing carbon-bonded and refractory products from refractory granulations, carbon carriers and organic binding agents.

Refractory products are used as linings of metallurgical vessels and as refractory functional products, e.g. so-called slide plates. Wear in the unit necessitates continuous replacement of the products, this wear occurring mainly due to corrosion by infiltration of slag, decarbonisation (oxidation of the coke bond and carbon carrier), abrasion and spalling of pieces of product as a result of thermal stresses.

The binding agents used for manufacturing these products are multifunctional. They enable the refractory moulding and guarantee dimensional stability of the products when installed in the unit and during subsequent first-time heating. In the burnt condition they form a coke bond and supply the carbon required to reduce the slag infiltration. The carbon used as the binding phase is produced by pyrolysis of organic initial compounds. For this purpose the refractory granulations are either hot mixed with carbonizing binding agents, like thermoplastic bituminous binding agents such as coal-tar pitches and aromatic petro pitches (referred to in the following as binder pitches) or are generally cold mixed with hardenable synthetic resins which form duroplastic structures after hardening at 150 to 250° C.

Because of the three-dimensional cross-linking the coke binding resulting from the pyrolysis or carbonisation of synthetic resins is isotropic, non-graphitable, hard and brittle, and because of the large inner surface it is sensitive to oxidation.

On the other hand the pyrolysis of binding pitch takes place in a liquid phase and results in a formation of ordered hexagonal carbon layers. An anisotropic, graphitable, soft, flexible coke bond is formed which is far more insensitive to oxidation because of its small inner surface. The use of binding pitch, unlike synthetic resin, generally results in less wear of the products in the unit, since the bond from binding pitches has a much better thermal shock and oxidation resistance because of its anisotropic coke structure.

When binding agents and refractory granulations are processed, a distinction is made between hot and cold moulding (hot and cold mixing process). In cold moulding the refractory granulations are fed into the unheated mixer at room temperature without preheating. The binding agent is generally added cold, i.e. at room temperature. In the case of highly viscous binding agents it may be fed preheated into the mixer for better dosing. Because of the internal friction of the granulation during mixing, the mixed product can be heated up to 60° C. The subsequent compression and moulding of the moist mass also take place at room temperature. The advantage of cold working, and hence synthetic resin binding, lies in the much lower investment costs since no expensive heating systems are required. Because all the components are cold processed the energy savings are considerable for continuous operation.

In hot moulding the refractory granulations and the binding agent must be brought to temperatures above the softening point of the binding agent before being fed into the mixer. The mixer must also be heated. The subsequent compression or pressing also takes place at temperatures above the softening point of the binding agent. Binder pitches with a coke yield that is sufficiently high for the application are solid or highly pasty at room temperature and can only be processed by hot moulding. A serious disadvantage of binder pitches, particularly coal-tar pitches, is the environmentally polluting and health hazardous content of benzo[a]pyrene (B[a]P) of up to 15,000 mg/kg. Since binder pitches are processed hot, B[a]P emissions take place due to the high vapour pressure in the heat, with the attendant risk potential. Hydrocarbon distillates containing B[a]P are also released when the refractory products are heated during first-time use. The legislator has taken account of this risk potential by identifying refractory products with a B[a]P content of over 50 mg/kg as hazardous material and stipulating that they must be handled taking appropriate precautions. In Germany the use of refractory products with less than 50 mg/kg of benzo[a]pyrene is therefore recommended in the so-called TRGS 551, whenever technically feasible. This shows that the use of binder pitches decreases for years in spite of all its technical advantages.

The manufacture of cold moulded refractory products using binder pitches is in principle of prior art. For instance, GB 690 859 discloses the manufacture of a ramming mix or bricks from refractory granulations and powdered binder pitch, where a plasticiser such as kerosene, benzole or creosote, which is intended to increase the density of the product obtained, is added to the mixture of refractory granulations and powdered binder pitch.

U.S. Pat. No. 3,285,760 discloses a ramming mix of refractory granulations and powdered binder pitch. Here the use of anthracene or heavy oil is proposed as a solvent or lubricant for the powdered binder pitch.

U.S. Pat. No. 3,415,667 discloses a technique for manufacturing pitch-bonded refractory mixes where a liquid organic solvent is used for liquefying the binder pitch. The liquefied binder pitch is mixed first with the coarse, then with the fine granulations and pressed. A trichlorinated hydrocarbon is preferably used as the solvent. A similar procedure is adopted in GB 978 185. In the method disclosed here a binder pitch and an organic solvent are mixed together so that a binder agent with a viscosity of no more than 80 Poise is formed. High processing effort and consumption is a common feature of both methods since the binder pitch and organic solvent first have to be processed into a usable binder agent in an additional process step.

The method described in U.S. Pat. No. 4,071,593 operates with a combination of binder pitch and an aqueous lignin sulphonate solution and/or a solution of hot hardening alkyd resins in organic solvents. Disadvantages of the method are that no hydration-sensitive raw materials such as dolomite can be processed and that in addition to anisotropic coke structures, oxidation-sensitive and brittle isotropic coke structures are obtained.

In the method described in DE 31 49 485 A1 0.5 to 15% binder pitch and up to 5% of an organic liquid, related to the binder pitch content, are added to the refractory mixture. However, such a mass is too dry for the pressing operation. It is concluded from the exemplary embodiment that spent sulphite liquor, water and clay are additionally required as plasticizers. In addition to a coke bond, a ceramic bond is therefore obtained. One disadvantage of the method is that no hydration-sensitive raw materials such as dolomite can be processed.

A common feature of all the methods listed is the high B[a]P content of the binder pitches. The products obtained must therefore be identified as hazardous substances according to European law and do not meet the recommendation of TRGS 551. Compared to synthetic resin systems, the binder agent combinations listed above have proved far inferior in terms of the product properties cold compressive strength, hot bending strength and porosity, and are therefore hardly ever used.

More recent developments allow the incorporation of pitch-typical, graphitable, anisotropic coke structures in synthetic resin bonded cold moulded products, in compliance with TRGS 551. In this case some of the synthetic resin is substituted by grinded low B[a]P and high melting binder pitch powder. However, the disadvantage compared to a pure pitch bond is that partially isotropic and hence oxidation-sensitive coke structures are present in the product (Boenigk, W. et al. CARBORES®—a carbon speciality to improve the performance of refractories bonded with phenolic resins, Proceedings Eurocarbon 2000, 1$^{st}$ World Conference on Carbon, 9 to 13 Jul. 2000, Berlin, pp. 367-368///Anezins, C. G. et al. Studies of special binder agents for refractory MgO—C products, Proceedings, 14$^{th}$ Conference on Refractory Building Materials, 20/21 May 2003, Prague, pp. 118-126).

DE 41 12 955 A1 describes the manufacture of a coal-tar pitch with a reduced carcinogen content, and its use as a binder and impregnation agent.

The essential object of the invention is to provide a method for manufacturing carbon-bonded refractory products which allows so-called cold mixing of the constituents used and enables refractory products to be obtained with an anisotropic coke structure with high strength and benzo[a]pyrene contents of below 50 mg/kg.

A further object of the invention is to provide a binder agent system for use in the above-mentioned method.

This object is achieved by a method for manufacturing carbon-bonded refractory products from refractory granulations and an organic binder agent, in which use is made of a powdery, graphitable coal-tar pitch with a benzo[a]pyrene content of less than 500 mg/kg and a coking value of at least about 80% by weight according to DIN 51905, and of a liquid, graphitable binder agent with a coking value of at least about 15% by weight, with a benzo[a]pyrene content of less than 500 mg/kg according to DIN 51905, this is mixed with the remaining constituents, transferred to a mould body and then treated at a temperature of 150 to about 400° C.

The powdery graphitable coal-tar pitch is soluble in the liquid binder agent at temperatures above about 150° C. It preferably has a softening point of over 180° C., and in particular preference over 220° C.

Surprisingly, it was established that the advantages of using synthetic resins on the one hand and coal-tar pitches on the other can be combined if the method according to the invention is implemented. In particular, the advantages result in the fact that work can be carried out using the energy-saving cold mixing method, and pitch-typical anisotropic and graphitable coke structures can still be obtained, resulting in high strengths of the refractory products obtained and significantly improved oxidation resistance.

The use of the selected coal-tar pitch according to the invention permits a low benzo[a]pyrene content in the refractory product of below 50 mg/kg. This coal-tar pitch is used according to the invention as a high temperature binder agent. This high temperature binder agent is preferably present in powder form. The mean grain size may be 10 to about 500 µm, preferably 50 to about 200 µm.

According to a further preferred embodiment the high temperature binder agent is wetted with a dust binder agent. This prevents the formation of dust and binder in the refractory mass can be improved. The dust binder agent is preferably a high boiling petroleum-derived oil which does not dissolve the powder. Naphthenic oils with boiling points of over 300° C. and a density of less than 1 are particularly well suited for this purpose. The dust binder agent may be used in a quantity of up to about 5% by weight, and in particular 0.5 to 3% by weight related to the total weight of the high temperature binder.

The liquid binder agent used according to the invention may be a solution of the high temperature binder in a highly aromatic oil, e.g. from the coal tar distillation. Of particular preference is a boiling range from a temperature of 250 to 370° C. The liquid binder agent acts as a plasticizer and therefore guarantees that the refractory mixture is mouldable and has sufficient strength for handling. The concentration of the high temperature binder in the highly aromatic oil depends on the viscosity of the liquid binder to be achieved. For example, it may be 10 to 85% by weight or 25 to 65% by weight, related to the mass of the fluid binder.

The powdery graphitable coal-tar pitch used as an organic binder according to the invention is obtainable by distillation of coal tar in a first distillation stage under normal pressure or reduced pressure, and by distillation of the residue of the first distillation stage under a pressure of preferably no more than 1 mbar in an evaporator, where the temperature in the evaporator is preferably within the temperature range of 300 to 380° C. The mean holding time of the residue in the evaporator is preferably 2 to 10 minutes.

The refractory mass obtainable according to the invention may contain, as a binder agent, 0.5 to about 4% by weight, preferably 1 to about 2.5% by weight, of the high temperature binder related to the total weight of the refractory mixture. The proportion of the liquid binder may be about 1.3 to about 4% by weight, preferably 2 to 3% by weight, related in each case to the total weight of the refractory mixture.

Suitable granulations according to the invention may include inorganic oxides, whose use is known for the manufacture of refractory bodies. These include, preferably, magnesium oxide, dolomite, aluminium oxide, zirconium oxide or their mixtures. Particular preferred is the use of magnesium oxide, e.g. melting magnesia and/or sinter magnesia.

To increase the carbon content of the refractory products it is possible to add to the mixture of refractory granulations, high temperature binder and organic binder, before moulding, further substances containing carbon, particularly graphite and/or carbon black. Furthermore, wetting and dehydration agents, e.g. sulphur, organic nitro compounds or inorganic nitrates, may also be added to improve miscibility and increase the coke yield and strength. Antioxidants may be added to reduce carbon oxidation when the finished products are used.

Moulding may be carried out by a known method with conventional pressing devices used in this technical field. For example, pressures of 100 to 300 MPa are suitable for moulding.

The so-called "green" product obtained is then subjected to heat treatment. This treatment may be carried out at a temperature of 150 to about 400° C. The treatment time depends on the size of the products formed, and may be up to about 20 or more hours. This results in an increase in hot crushing strength.

The desired final coke structure of the binder agent is formed when the tempered material is first heated in the unit.

The refractory bricks manufactured with the binder system according to the invention may also be processed without problem. After pressing cold crushing strengths of 6 to 12 MPa, and hence a similar level as with cold moulded synthetic resin bonded stones, are obtained. The cold crushing strengths after tempering range from 20 to 30 MPa, and are suitably high for installation without problem in the unit and for the mechanical loads exerted during initial heating. After carbonization at 1,000° C. cold compressive strengths of 20 to 30 MPa and a porosity of about 11% are obtained. The cold crushing strength and porosity are comparable to those of resin-bonded products. The new binder systems form a purely anisotropic, graphitable and soft coke matrix (soft-bonding). This results in improved thermal shock and oxidation resistance of the products. The products manufactured with the coal-tar pitch used according to the invention as high temperature binder have a benzo[a]pyrene content of <50 ppm, meet the recommendation of the German TRGS 551, and need not be labeled as a hazardous substance according to European law.

The following examples serve as a further illustration of the invention. DIN standards were applied as far as possible for the analysis.

EXAMPLES

The technical standards that were applied to characterise the materials used according to the invention are indicated in Table 1.

TABLE 1

| Standards | |
|---|---|
| Softening point | DIN 51920 |
| Toluene-insoluble (TI) | DIN 51906 |
| Chinoline-insoluble (Q) | DIN 51921 |
| Coking value | DIN 51905 |
| Ash | DIN 51922 |
| Benzo[a]pyrene | HPLC |

Example 1

Manufacture of a High Temperature Binder From Coal-Tar Pitch

A coal-tar pitch [softening point (Mettler) EPM=113° C., TI=29%, QI=8.5%, β resins=20.6%. coking value=59.2%, B[a]P content=1.1%, commencement of melting (TMA)= 36°, end of melting (TMA)=86° C.] is distilled at a vacuum of 1 mbar, with a distillation temperature of 355° C. in the evaporator at a mean holding time of about 5 minutes. The pitch obtained may be used according to the invention as a high temperature binder (binder A), and is characterised by analysis data from Table 2.

TABLE 2

Properties of the resulting high temperature binder

| Product | Coking value [% by wt.] | Ash [% by wt.] | TI [% by wt.] | QI [% by wt. | Softening point[° C.] | B[a]P content [ppm] |
|---|---|---|---|---|---|---|
| Binder agent A | 85.5 | 0.3 | 57.5 | 16.2 | 230 | 273 |

Example 2

Manufacture of a Liquid Binder Agent From a High Temperature Binder 40 parts by weight of the coal-tar pitch from Example 1 are dissolved in 60 parts by weight of anthracene oil (B[a]p content 40 ppm, boiling range 250-370° C.). The binder agent B obtained has the properties indicated in Table 3.

TABLE 3

Properties of the liquid high temperature binder obtained

| Product | Coking value [% by wt.] | Ash [% by wt.] | TI [% by wt.] | QI [% by wt.] | Dynamic viscosity 20° C. [mPas] | B[a]P content [ppm] |
|---|---|---|---|---|---|---|
| Binder agent B | 32 | 0.3 | 17.9 | 5.4 | 3,000 | 220 |

Example 3

Manufacture of Three Batches of the Moulded Bodies Obtainable From Them

Three batches (3a-c) are manufactured according to the method of the invention and compared with 3 comparative batches (V1-3). A phenol resin system commonly used today, consisting of liquid resol and a powdery Novolak, is used in V1, and an anthracene oil according to U.S. Pat. No. 3,285, 760 is used in V3 and a traditional coal-tar pitch in V2.

For manufacturing the moulded body pyrolised according to the invention the liquid binder agent B from Example 2 is added to each granulation in a quantity of 2% by weight and the high temperature binder A from Example 1 is added in a quantity of 1.3% by weight (Offset 1), 2.3% by weight (Offset 2) and 3.3% by weight (Offset 3), related in each case to the total weight of refractory mixture. The properties of the granulations used are indicated in Table 4. Sufficient graphite is added (9-12%) for the products to reach a residual carbon content of 13 to 14%. The properties of the graphite used are indicated in Table 5. Mixing takes place in a forced mixer commonly used in refractory industry, without heating. The composition of the mixtures is indicated in Table 8.

The moist mass prepared is compressed to form moulded bodies under a pressure of 150 MPa. The moulded bodies are then tempered at 300° C., then pyrolised/coked at 1000° C. The properties of the refractory products are summarised in Table 7.

TABLE 4

Properties of the refractory granulations

| MgO raw material | Bulk density weight per volume g/cm³ | MgO, % by wt. | Fe₂O₃ % by wt. | C/S ratio |
|---|---|---|---|---|
| Melting magnesia | 3.52 | 97.8 | 0.5 | 3 |
| Sinter magnesia | 3.41 | 98.0 | 0.12 | 6 |

TABLE 5

Properties of the graphite used

| Type | Normal flakes |
|---|---|
| Carbon content | 94–96% by wt. |
| Ash content (DIN 51903) | 4–6% by wt. |
| Moisture content (DIN 51904 | <0.3% by wt. |
| Particle size distribution (DIN 51938) | min. 70% by wt. >160 μm<br>min. 95% by wt. >71 μm |
| Specific surface area (DIN 66131) | 1 m²/g |

TABLE 5-continued

Properties of the graphite used

| | |
|---|---|
| Bulk density (DIN EN ISO 60) | 650 g/l |

TABLE 6

Composition of the mixtures

| Components | batch 1 [% by wt.] | batch 2 [% by wt.] | batch 3 [% by wt.] | Comparison V1 [% by wt.] | Comparison V2 [% by wt.] | Comparison V3 [% by wt.] |
|---|---|---|---|---|---|---|
| Melting magnesia 3–6 mm | 19.52 | 19.50 | 19.56 | 19.61 | 19.56 | 19.59 |
| Melting magnesia 1–3 mm | 31.40 | 31.37 | 31.46 | 31.55 | 31.46 | 31.52 |
| Melting magnesia 0 s 1 mm | 21.22 | 21.19 | 21.26 | 21.32 | 21.26 | 21.30 |
| Magnesia powder (DIN 70) | 12.73 | 12.72 | 12.75 | 12.79 | 12.75 | 12.78 |
| Floc graphite | 11.57 | 11.08 | 9.86 | 11.63 | 9.86 | 11.62 |
| Anthracene oil | | | | | | 1.3 |
| Binder agent B | 2.0 | 2.0 | 2.0 | | | |
| Binder agent A | 1.3 | 2.3 | 3.3 | | | 2.0 |
| Novolak powder | | | | 1.2 | | |
| Resol, liquid | | | | 2.0 | | |
| Coal-tar pitch | | | | | 5.0 | |
| Residual carbon | 13.2 | 13.5 | 13.1 | 13.1 | 13.1 | 13.2 |

Results

TABLE 7

Properties of the pressed, tempered and pyrolised moulding bodies

| | | After pressing | | After tempering (300° C.) | | | | | After coking (1000° C.) | | | | |
|---|---|---|---|---|---|---|---|---|---|---|---|---|---|
| | | | | Apparent density g/cm³ | Length variation, % | | | | Apparent density g/cm³ | length var. % | | | |
| Example | Binder agent % by wt. | Apparent density g/cm³ | CCS N/mM² | | in pr* | penpendicular to pr* | CCS N/mm² | OP, % | in pr | perpendicular to pr* | CCS N/mm² | OP, % | Coke structure |
| 1 | 1.3% A + 2.0% B | 2.99 | 10 | 2.97 | 0.40 | 0.4 | 30 | 7.9 | 2.9 0.37 | 0.36 | 27 | 11.2 | anisotropic |
| 2 | 2.3% A + 2.0% B | 2.99 | 10 | 2.94 | 0.58 | 0.28 | 26 | n.a. | 2.88 0.45 | 0.36 | 26 | 11.5 | anisotropic |
| 3 | 3.3% A + 2.0% B | 2.96 | 10 | 2.88 | n.a. | n.a | 21 | n.a. | 2.81 0.54 | 0.39 | 21 | n.b. | anisotropic |
| V1 | 2.0% resol + 1.2% Novolak powder | 3.05 | 10 | 3.03 | 0.08 | 0.04 | 69 | 3.3 | 2.98 0.10 | 0.24 | 28 | 9.5 | anisotropic |
| V2 | Coal-tar pitch | 2.95 | 24 | 2.84 | 0.94 | 0.74 | 22.9 | 10.6 | 2.82 1.03 | 0.89 | 24.2 | 12.5 | anisotropic |
| V3 | 1.3% anthracene oil + 2% B | 2.99 | 7 | 2.91 | n.a. | n.a. | 18 | n.a. | 2.86 0.35 | 0.31 | 16 | 13.5 | anisotropic |

A = powdery, graphitable high temperature binder,
B = liquid graphitable high temperature binder
*= pr = press direction In batches 1 to 3 the concentration of the liquid binder pitch is kept constant, whilst the concentration of the powdery high temperature binder varies. It is shown that as the content of powdery high temperature binder increases, the porosity of the moulded body increases and the mechanical strength is reduced. Moulded bodies with strengths equivalent to phenol resin bonded moulded bodies can be successfully manufactured by the method according to the invention. However, a major advantage of the moulded bodies manufactured according to the invention is their anisotropic coke structure. The advantages of the anisotropic coke structure lie in the generally higher flexibility, higher oxidation resistance and higher thermal shock resistance.

It can be seen from Example 3 and the comparative examples that the carbon-bonded refractory products manufactured according to the invention have considerable advantages over products obtained with conventional coal-tar or synthetic resin binder systems. They combine the advantages of both previously mentioned systems. The moulded bodies can be manufactured by the cold mixing method in an energy-saving and environmentally friendly manner, they have low benzo[a]pyrene contents, yet form anisotropic coke structures with their well-known advantageous properties.

The invention claimed is:

1. A method for manufacturing carbon-bonded refractory products, comprising:
   using organic binder agents consisting essentially of a powdery, graphitable coal-tar pitch with a benzo[a]pyrene content less than 500 mg/kg and a coking value of at least about 80% by weight according to DIN 51905 and a graphitable binder agent that is liquid at room temperature with a coking value of at least about 15% by weight and a benzo[a]pyrene content less than 500 ppm according to DIN 51905, wherein said liquid graphitable binder agent consists essentially of a concentration of said powdery, graphitable coal-tar pitch in an amount of 10 to 65% by weight in a high boiling aromatic oil;
   mixing at room temperature said organic binder agents and refractory granulations to form a mixture;
   transferring said mixture to a moulded body; and
   heat treating said mixture at a temperature of 150 to about 400° C.

2. The method according to claim 1, wherein said organic binder agents comprise 0.5 to about 4% by weight of said powdery, graphitable coal-tar pitch and 1.3 to about 4% by weight of said graphitable binder agent.

3. The method according to claim 1, wherein said using organic binding agents step comprises:
   distilling coal-tar in a first distillation stage under normal or reduced pressure; and
   distilling a residue of said first distillation stage under a pressure of no more than 1 mbar in an evaporator with a temperature that ranges from 300 to 380° C., wherein said residue has a mean residence time of 2 to 10 minutes.

4. The method according to claim 3, wherein said using organic binding agents step comprises using a solution of said powdery, graphitable coal-tar pitch in an anthracene oil.

5. The method according to claim 1, wherein said powdery, graphitable coal-tar pitch is in the form of a powder with a mean grain size of 10 to about 500 μm.

6. The method according to claim 1, wherein said powdery, graphitable coal-tar pitch has a softening point of over about 180° C.

7. A method for manufacturing carbon-bonded refractory products, comprising:
   using organic binder agents consisting essentially of a powdery, graphitable coal-tar pitch with a benzo[a]pyrene content less than 500 mg/kg and a coking value of at least about 80% by weight according to DIN 51905 and a graphitable binder agent that is liquid at room temperature with a coking value of at least about 15% by weight and a benzo[a]pyrene content less than 500 ppm according to DIN 51905, wherein said liquid graphitable binder agent consists essentially of a concentration of said powdery, graphitable coal-tar pitch in an amount of 10 to 65% by weight in a high boiling aromatic oil;
   mixing at room temperature said organic binder agents and refractory granulations to form a mixture;
   transferring said mixture to a moulded body;
   heat treating said mixture at a temperature of 150 to about 400° C.; and
   adding a naphthenic oil to said powdery, graphitable coal-tar pitch before mixing with said graphitable binder agent, wherein said napthenic oil does not dissolve said powdery, graphitable coal-tar pitch.

8. The method according to claim 1, further comprising adding a carbon carrier to said mixture of refractory granulations and the organic binder agent before said transferring step.

9. The method according to claim 8, wherein said carbon carrier is graphite and/or carbon black.

10. The method according to claim 1, wherein the heat treating step results in the carbon-bonded refractory product having an anisotropic coke structure.

* * * * *